June 14, 1960

A. L. SCHILS 2,940,127

CAPACITOR END SEAL PROCESS

Filed Feb. 13, 1956

United States Patent Office 2,940,127
Patented June 14, 1960

2,940,127
CAPACITOR END SEAL PROCESS

Alvin L. Schils, Nashua, N.H., assignor to Sprague Electric Company, North Adams, Mass., a corporation of Massachusetts Filed Feb. 13, 1956, Ser. No. 564,989

2 Claims. (Cl. 18—59)

The present invention relates to a new and improved process for producing resin bonded floating disc end seal constructions.

For many years small electrostatic capacitors have been produced utilizing external enclosures such as metal cans to protect the capacitance section. The metal enclosures are of a hermetically sealed construction utilizing numerous types of end seals known within the art. A particularly desirable end seal incorporating a resin bonded floating disc construction is set forth in the Walter C. Lamphier United States patent application, Serial No. 488,329, filed February 15, 1955. Although the product disclosed by Lamphier is remarkable for its simplicity and ability to produce an effective seal which can be cycled from extremely low to extremely high temperatures without failure of the seal, the disclosed process is time consuming and difficult to control quality-wise.

It is an object of the present invention to produce a capacitor end seal using a resin bonded floating disc construction by a process of markedly improved efficiency and quality. A further object is to produce an easily assembled and cured resin end seal.

Figure 1:
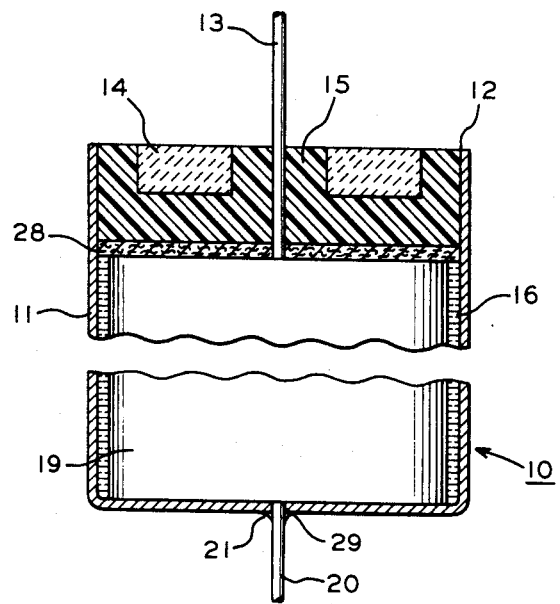
Figure 2:
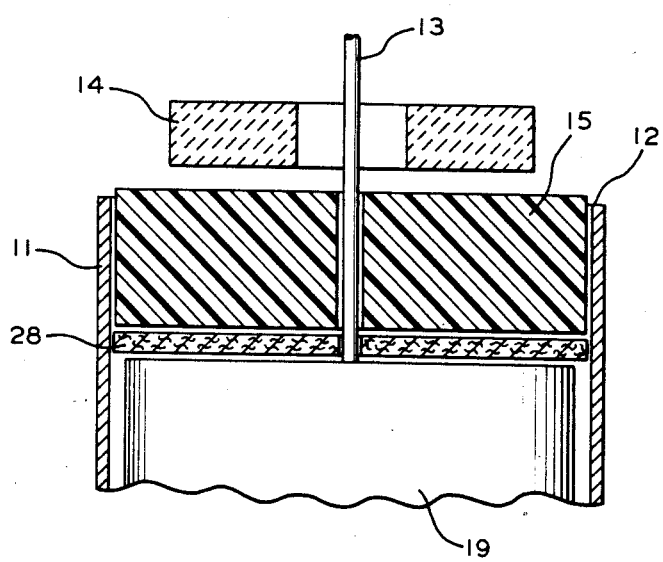

Still further objects of the invention, as well as the advantages thereof, will be apparent from the body of this specification, the appended claims, and the accompanying drawing in which: Fig. 1 is a sectional view of a capacitor assembly including the resin bonded floating disc end seal constructed according to this invention; and Fig. 2 is an expanded fragmentary sectional view of the components of the resin bonded floating disc end seal in position in the mouth of a capacitor prior to the final processing steps of this invention.

In its broadest scope this invention is concerned with an improvement in the process of producing encased electrical components having a resinous end seal which improvement includes the steps of pelleting a mineral filled epoxy resin annular disc before placing it in the end of the casing to be sealed and thereafter thermally curing the end seal assembly simultaneous with vibration of said assembly.

A representative finished product resulting from the process of this invention is illustrated in Fig. 1 wherein there is shown a capacitor assembly 10 in which there is employed a cylindrical metallic container 11, housing a wound capacitor section 19, and having an open end 12, through which terminal lead 13 of the capacitor projects. About the lead is seen a filled epoxy resin mass 15 in which is positioned a ceramic washer 14. If desired, a second washer 28 of fibrous material such as paper can be used to keep the epoxy resin from contact with the capacitor section 19 and dielectric impregnant 16, thereby avoiding any inneraction between them. The can has a bottom hole 29 through which another terminal lead 20 of the enclosed capacitor projects. The hole 29 is closed by means of lead-tin solder 21, or other suitable metal alloy, to hermetically seal the unit. Before sealing, the unit can be impregnated with a liquid dielectric 16 that enters through hole 29 and fills all pores and voids within capacitor section 19, as well as the space between the container 11 and the capacitor.

The preferred resin is of the epoxy type which is well-known in the art, some of them being disclosed in the Buck et al. United States Patent No. 2,569,929, the Wiles Patent No. 2,528,934, the Greenlee Patent No. 2,542,664, the Bixler Patent No. 2,512,996, the Bender et al. Patent No. 2,506,486, the Greenlee Patents No. 2,510,885 and 2,510,886, the Newey et al. Patent No. 2,553,718, the E. S. Narracott article "Application of Some Epoxide Resins in the Plastics Industry" in British Plastics, October 1951, pages 341–345 and the W. J. Marmion article "Epoxide Resins" in Research, September 1954, pages 351–355. In use as an end seal the resin normally is filled with a material which modifies the temperature coefficient of expansion so as to approximate that of the metal housing of the unit. Suitable fillers include alumina, silica, mica, and other similar materials which are admixed into the resin in an amount dictated by the desired temperature coefficient of expansion.

Generally in the practice of the process of the invention the following steps are performed, although it is to be understood that in practice several of the steps can be combined into a single operation: blending of the resin and filler into a uniform mixture; pelleting the filled resin into an annular disc, assembly of said pelleted disc and an annular ceramic washer into the open end of the capacitor casing (as shown in Fig. 2), and heating of the assembled unit simultaneous with vibration of said assembly.

In the blending of the resin and the filler, it is desirable to substantially uniformly distribute the particles of filler into the resinous mass. Such a substantially uniform distribution avoids uneven distribution of mechanical stress in the finished end seal when the hermetically sealed unit is temperature cycled over an extreme temperature range, e.g., from $-50°$ C. to $+125°$ C. Typical of a composition which is blended for end seals of metal cased units is 30 parts by weight of the condensation pronduct of 4 mols of diphenylopropone with 5 mols of epichlorohydrin in the presence of an excess of 10% aqueous NaOH to 60 parts by weight of powdered silica passing through a 300 mesh screen and 2 parts by weight of dimethylene triamine. Such a composition is blended by thoroughly mixing in any of the well-known blenders, e.g., model LD–25 which is a smooth-walled, V-shaped, motor-driven blender sold by Patterson-Kelly, for a period of about 15 to about 20 minutes. Generally the blending should be carried out in an atmosphere of relatively low humidity, e.g., less than 10%.

The blended powder which has been stored in a moisture-free atmosphere is thereafter pelletted into the desired annular disc dimension.

The preforming of these resin discs can be held to a thickness variation of approximately ±1 mil by use of a conventional press using punch die and core rod, which presses are well known to the art. Useful pressures for obtaining the preforms according to the inventive process, range from about 1500 to 3000 pounds per square inch for the filled epoxy resin composition set forth above.

Now that the annular disc preform has been produced, the product can be distributed to the assembly operators for incorporation into the capacitor in the manner shown in Fig. 2. After assembly of the capacitor section into the metal container, a preform annular pellet and thereafter a steatite or similar ceramic disc which may be either slotted or annular is placed over the assembly and racked up into suitable processing jigs, which jigs may include for example 1000 piece lots. In contrast to the previous procedure, it is to be noted that the ceramic annular disc merely sits on the surface of the resin disc.

The pelleted annular disc is flowed onto the inner surface of the container and onto the lead wire under thermal and vibratory influences. The racked metal can type of units set forth immediately above are exposed to an atmosphere of elevated temperature for an initial precure to both dispose the resin into contact with both the inner surface of the metal casing and the terminal lead wire, and to allow the immersion of the ceramic annular disc into the resin disc until at least the outer surface of the annular ceramic disc is substantial planar to the surface of the resin. Such precure is accomplished for the mineral filled epoxy resin by heating for about 20 minutes in an atmosphere of about 275° F. Simultaneous with this exposure to temperature, the units are vibrated so as to facilitate the thermal flow of the resin. Surprisingly enough it has been found that low level vibration readily seats the annular ceramic disc into the resinous mass to produce remarkably uniform end seals of much improved quality and mechanical nature. A convenient way of carrying out the precure of the units is to place them in a conveyor oven with the desired temperature and utilize the vibration of the conveyor belt as it passes through the oven to seat the ceramic annular disc in the aforementioned uniform manner. The preferred vibration has a frequency of about 15 cycles per second and amplitude of about 2 inches. Broadly speaking the frequency can range upwards from 5 cycles to the ultrasonic range, e.g., 5000 to 6000 c.p.s. and the amplitude to be within the invention should not exceed inches.

Finally the metal encased units are subjected to a further thermal treatment. This is obtained for the silica filled epoxy type of end seal construction by exposure to a temperature of from about 250° F. to about 350° F. for a period of about 1½ to about 2½ hours. Thereafter, if desired, the units are impregnated with the particular impregnant acquired by the application. The impregnation step does not constitute part of the present invention.

As an example of the present invention without limiting its scope, a capacitor section made of convolutely wound ribbons of aluminum foil and paper, with the respective electrode foils projecting from opposite ends of the winding, had 0.02" in diameter lead wires of dip-tinned copper separately soldered to their respectively extensions. This section was placed in an open ended cylindrical brass can having an outer diameter of 0.175". The closed end of the container had a central opening 0.04" in diameter, through which opening, one of the lead wires was passed. The end seal composition was made up of 60 parts by weight of powdered epoxy resin and 30 parts by weight of powdered silica passing through a 300 mesh screen, and 2 parts by weight of dimethylene triamine, the catalytic agent. The mixture was blended for a period of 15 minutes in a blending machine. The powder was fed into a Stokes Model F press which produced a pellet of 0.116" thickness, an outer diameter of 0.146" and a slot extending to the center of the pellet 0.50" wide. A paper washer was placed over the central lead wire and disposed against the exposed end of the capacitor section. The preform pellet was placed down against the paper spacer and thereafter a steatite annular disc having an outer diameter of 0.13" and an inner diameter of 0.05" and a maximum thickness of 0.078" was slipped over the lead protruding from the open end and disposed against the preformed resinous disc. The unit was then placed in a rack and sent through a conveyor belt oven exposing it for 20 minutes to a temperature of approximately 275° F. During this exposure continual vibration of the said section was developed by the movement of the conveyor belt which vibration had an amplitude of 2 inches at a frequency of about 15 cycles per second. Thereafter the unit was removed from the conveyor belt and placed into an oven at 300° F. for two hours, obtaining a full and complete cure of the end seal construction. Finally the unit was impregnated with polyisobutylene by vacuum techniques and the impregnation channel was sealed by solder. The resulting assembly can satisfactorily withstand as many as 100 thermal cycles of cooling to −55° C. and heating to 100° C. without apparent change, in fact the unit can be taken directly from a dry-ice bath, held at −55° C. and immediately dropped into boiling water without damaging the seal or any other portion of the assembly.

The advantages of our invention are in the most part obvious. The reject level is reduced by 95% over that resulting with prior art techniques. The surprising improvement in quality and uniformity is simultaneous with substantial saving in the amount of resin used, thus markedly reducing the cost of the unit as well as reducing the amount of labor required for production.

As many apparently widely different embodiments of this invention may be made without departing from the spirit and scope thereof, it is to be understood that the invention is not limited to the specific embodiments hereof as defined in the appended claims.

I claim:

1. A process for providing an end seal for an open end of a metallic capacitor casing wherein said seal has a ceramic annulus embedded in a mineral-filled epoxy resinous mass contiguous with said casing and a lead-wire of said capacitor, said process comprising blending mineral filler and epoxy resin particles, pelleting said blended filler and resin into a preform adapted to approximately fill the open end of said casing and provided with passage means to accommodate said lead-wire, positioning said preform in said open end with said lead-wire passing therethrough, superposing a ceramic annulus on said preform around said lead-wire, heating and vibrating the assemblage of casing, lead-wire, preform, and annulus whereby said annulus is seated in said preform substantially flush therewith, and said preform flows into intimate engagement with said casing and said lead-wire while substantially filling said open end of said casing.

2. A process for providing an end seal for an open end of a metallic capacitor casing wherein said seal has a ceramic annulus embedded in a mineral-filled epoxy resinous mass contiguous with said casing and a lead-wire of said capacitor, said process comprising blending mineral filler and epoxy resin particles, pelleting said blended filler and resin into a preform adapted to approximately fill the open end of said casing and provided with passage means to accommodate said lead-wire, positioning said preform in said open end with said lead-wire passing therethrough, superposing a ceramic annulus on said preform around said lead-wire, precuring said preform by exposure to an atmosphere of about 275° F. for about 20 minutes while vibrating said casing, and thereafter heating at a temperature of from about 250° F. to about 350° F. for a period of from about 1½ to about 2½ hours, whereby said annulus is seated in said preform substantially flush therewith, and said preform flows into intimate engagement with said casing and said lead-wire while substantially filling said open end of said casing.

References Cited in the file of this patent

UNITED STATES PATENTS

| | | |
|---|---|---|
| 2,017,204 | Fisher et al. | Oct. 15, 1935 |
| 2,235,001 | Allen | Mar. 18, 1941 |
| 2,296,453 | Saffert | Sept. 22, 1942 |
| 2,444,880 | Robinson | July 6, 1948 |
| 2,464,568 | Flynn et al. | Mar. 15, 1949 |
| 2,611,793 | Simpson | Sept. 23, 1952 |
| 2,636,073 | Clarke | Apr. 21, 1953 |
| 2,790,941 | Dawson | Apr. 30, 1957 |